United States Patent [19]

Meade

[11] 4,068,033

[45] Jan. 10, 1978

[54] HEAT-RELEASABLE DECALCOMANIAS AND ADHESIVE COMPOSITION THEREFOR

[75] Inventor: Hazel Meade, Pleasantville, N.Y.

[73] Assignee: Commercial Decal, Inc., Mount Vernon, N.Y.

[21] Appl. No.: 742,417

[22] Filed: Nov. 17, 1976

Related U.S. Application Data

[63] Continuation-in-part of Ser. No. 555,071, March 3, 1975, abandoned.

[51] Int. Cl.² .......................... B32B 3/00; C08L 1/28
[52] U.S. Cl. .................................... 428/201; 156/89;
 260/16; 260/17 R; 260/31.6; 427/148; 428/355;
 428/484; 428/500
[58] Field of Search .............. 260/17 R, 22 CB, 27 B,
 260/31.4 R, 31.6, 31.8 R, 33.2 R, 33.4 R, 862,
 873, 874, 901, 16, 17; 528/328, 329; 428/201,
 914; 156/89

[56] References Cited

U.S. PATENT DOCUMENTS

| | | | |
|---|---|---|---|
| 3,007,829 | 11/1961 | Akkeron | 427/148 |
| 3,060,148 | 10/1962 | Evans et al. | 260/31.6 |
| 3,404,021 | 10/1968 | Newman et al. | 428/914 |
| 3,429,840 | 2/1969 | Lowe, Jr. et al. | 260/17 R |
| 3,477,969 | 11/1969 | Parker | 260/17 R |
| 3,533,822 | 10/1970 | Bailey | 428/914 |
| 3,869,416 | 4/1975 | Hoh | 260/27 R |
| 3,883,617 | 5/1975 | Krieg et al. | 260/901 |
| 3,926,879 | 12/1975 | Fourier et al. | 260/27 R |

*Primary Examiner*—Edward M. Woodberry
*Attorney, Agent, or Firm*—Lerner, David, Littenberg & Samuel

[57] ABSTRACT

An adhesive composition for a heat-releasable ceramic decalcomania is provided, the adhesive composition comprising an acrylic resin, a tackifier for said acrylic resin, which tackifier comprises a polyethylene glycol and/or solid polyoxyalkylene derivatives of propylene glycol or ethylenediamine, and an organic solvent therefor. Preferably, this tackifier is employed in combination with a second tackifier comprising one or more aromatic acid esters of monomeric and polymeric alkyl polyols.

A heat-releasable ceramic decalcomania is provided which comprises a backing sheet, optionally a wax-impervious barrier layer disposed on said backing sheet, a wax layer disposed on said backing sheet or barrier layer (where employed), a design receiving support layer disposed on said wax layer, a design layer disposed on said support layer, and an adhesive layer as described above disposed on said design layer.

In addition, methods for forming such decalcomania and for decorating ware with such decalcomania are also provided.

30 Claims, 2 Drawing Figures

HEAT-RELEASABLE DECALCOMANIAS AND ADHESIVE COMPOSITION THEREFOR

CROSS-REFERENCE TO RELATED APPLICATION

This application is a continuation-in-part of Ser. No. 555,071, filed on Mar. 3, 1975, in the name of Hazel Meade, now abandoned.

FIELD OF THE INVENTION

The present invention relates to an adhesive composition for use in heat-releasable ceramic decalcomania, a heat-releasable ceramic decalcomania, a method for forming such a decalcomania and a method for decorating ceramic wares employing such decalcomania.

BACKGROUND OF THE INVENTION

Generally, a decalcomania (decal) is comprised of a multilayer structure including a backing paper, a design of pigment layer formed from inorganic pigments or oxides, and optionally a protective layer applied over the design layer. A layer facilitating release of the backing from the design may be interposed between the backing paper and the design layer. Such a decalcomania, depending upon its specific structure and especially the manner in which the backing paper is released from the design layer, can usually be classified as being of the slide-off type or the heat-release type.

The heat-release type of decalcomania includes a backing sheet which carries a heat-releasable wax layer, as will be described in detail hereinafter, which is separated from the backing sheet by means of a so-called barrier layer. A design layer including a resinous carrier is printed on the wax layer and a layer of heat-activatable adhesive is disposed on the design layer. Examples of typical heat-releasable decalcomanias are disclosed in U.S Pat. Nos. 2,970,076 to Porth; 3,007,829 to Akkeron; 2,991,221 to Bower; 3,411,458 to Milliken; 3,445,309 to Milliken and 3,642,551 to Laconich et al.

In using the heat-release type of decalcomania, the article to be decorated is preheated and the decalcomania is applied to the article with the backing sheet up so that the layer of heat-activatable adhesive directly contacts the article. The heat of the article effects both a preliminary bonding of the design layer, via the heat-activatable adhesive, to the article, and also the release of the backing sheet including the barrier layer and a portion of the wax layer, from the design layer. Thereafter, the article is fired at a high temperature in the usual manner so that the design layer is melted and permanently fused to the article; the combustible organic ingredients including the remaining portion of the wax layer, the resinous carrier for the design layer as well as the heat-activatable adhesive layer are consumed during the firing.

As indicated, the technique for bonding heat-releasable type of decalcomanias requires that the article to be decorated must be preheated in order to soften the heat-activatable adhesive layer. The preheating must be carried out so that the area of the article to which the decalcomania is to be applied is maintained at a steady even temperature. Such preheating requires the use of expensive heating equipment and even with such equipment it is difficult to ascertain whether the article is heated to the required temperature. If, in fact, the article is not heated to the proper temperature, that is at the temperature required to soften the adhesive without causing it to melt and flow away, blisters or air pockets could form in the decalcomania as it is fired on the ware. This could, of course, ruin the decorative effect of the decalcomania.

Preheating of the articles has also been found objectionable to personnel handling the articles. The preheated articles are rather hot and personnel handling same usually are required to wear bulky and cumbersome equipment to protect them from being injured.

It should also be noted that these various decalcomanias have been employed for the decoration of various articles, including glassware, ceramic ware, etc. In connection with said decoration of ceramic ware, decalcomanias of both the "underglaze" and "overglaze" type have been utilized. In the former case, the decal is applied to the ware after its formation, but prior to its being glazed, which is accomplished after application of the decal to the ware. The glaze employed comprises a vitreous coating which generally requires a very high temperature to form the glass from its raw materials. While this procedure therefore results in a protective coating over the pigments in the decal, these high temperatures generally destroy the color values of these pigments. Thus, "overglaze" decalcomanias have also been developed, i.e. — which are applied to the ware after it has been glazed. These generally include silk screen and lithographic decals. The present invention is intended for application in connection with all of the various types of decal applications.

In addition, in the past various adhesive films have been developed for use on labels, adhesive tapes, and the like which have a property referred to as "delayed track". This refers to the characteristic of these adhesives such that a thermoplastic composition, after being heated to a temperature at which it becomes tacky or adhesive, thereafter remains in its tacky condition for an interval after heating is discontinued. Such adhesive compositions are taught, for example, in U.S. Pat. No. 2,462,029 to Perry; U.S. Pat. No. 2,613,191 to McGaffin et al; U.S. pat. No. 2,746,885 to Holt, Jr.; U.S. Pat. No. , 2,608,543 to Wiswell; and U.S. Pat. No. 2,613,156 to McGaffin et al. Each of these patents relates to such adhesive compositions for use in labels and the like including the use of plasticizers in connection with various thermoplastic polymers in aqueous solutions. Furthermore, in many of these cases, the thermoplastic materials are used as thickeners or binders, containing inorganic salts and the like.

BRIEF STATEMENT OF THE INVENTION

It has now been found that the disadvantages associated with the prior art heat-releasable decalcomanias which require preheating of the article to be decorated can be overcome by employing a special adhesive composition over the design layer or the protective layer for such design layer, which will allow preheating of the decalcomania including such adhesive composition so that the preheated decalcomania can be applied to a cold article or ceramic ware. This is possible through the use of the adhesive composition of the invention which has a relatively low melting point for example, below 250° F., which upon being heated to at least its softening point will soften and become tacky. The heated adhesive composition will remain sufficiently tacky long enough to effect a preliminary bonding of the design layer to a cold ceramic ware while allowing release of the backing sheet including the barrier layer and a portion of the wax layer from the design layer.

The adhesive composition employed in the heat-releasable ceramic decalcomania of this invention will generally comprise (a) an acrylic resin which functions as an adhesive base material, (b) a plasticizer or, as referred to herein, a tackifier, for said acrylic resin, said tackifier being capable of providing an adhesive which softens when subjected to heat and remains tacky at a temperature substantially below its melting point. Furthermore, tackifiers are employed which can be cleanly burned upon final firing without the deposition of a harmful residue. Such tackifier will include a polyethylene glycol, and/or a solid polyoxyalkylene derivative of propylene glycol or ethylenediamine, and (c) a major amount of an organic solvent. Preferably, however, a combination of tackifiers will be utilized, including a tackifier as noted above in combination with a second tackifier including one or more aromatic acid esters of monomeric and polymeric alkyl polyols.

The adhesive composition may also include an alkyd resin to modify the adhesive quality thereof and/or a cellulosic derivative which moderates the tackiness of the mixture of acrylic resin and tackifiers and enhances the cohesiveness thereof. That is, the cohesiveness of the adhesive of this invention is of extreme importance, particularly as compared to various delayed tack adhesives in aqueous solutions previously employed in connection with various labels, stickers and the like. These materials would not be useful in the present decalcomanias in view of their lack of cohesiveness, their inability to burn-off after application of the decals, and their binding properties as compared to the film-formers of this invention.

Also, the adhesive composition may include a polystyrene plasticizer which can aid in lowering the melting point of the adhesive coating, and/or other solid plasticizers which can also act as tackifiers.

Thus, in accordance with the present invention, there is provided a heat-release ceramic decalcomania comprising a decalcomania backing, said backing comprising a backing sheet, such as a paper sheet, a wax-impervious barrier coating disposed on said backing sheet, and a wax layer disposed on said barrier coating, optionally a sealant or support layer dispoed on said wax layer, said sealant layer comprising a cellulosic derivative or resinous film-forming agent, a design layer disposed on said wax layer or said sealant or support layer, and a heat-activatable adhesive composition as described above disposed on the design layer. The so-formed decalcomania is preheated to at least the softening point of the adhesive composition and is applied to an article to be decorated, with the backing sheet up, so that the layer of softened heat-activatable adhesive directly contacts the article and temporarily bonds the decalcomania to the article. The heat which activates the adhesive also causes the backing sheet including the barrier layer and a portion of the wax to be released from the design layer. Thereafter, the remaining assemblage is fired thereby causing the design layer to fuse and form a permanent bond with the article.

Furthermore, in accordance with the present invention, there is provided a heat-release ceramic decalcomania which includes two design layers, a first design layer of which may be a protective layer in the form of a glass flux layer, in situ, disposed over a second design layer, said decalcomania comprising a decalcomania backing as described above, a first sealant or support layer, a first design layer disposed on the sealant layer, a second sealant layer, which may be of the same or different composition than the first sealant layer, disposed on the first design layer, a second design layer disposed on said second sealant layer and a heat-activatable adhesive composition as described above disposed on said second design layer.

Where the first design layer comprises a protective layer of glass flux, which is deposited by silk screening or other means, the glass flux layer may be deposited directly on the wax layer. Thus, the first sealant layer would not be required in this case; however, it is preferred that the protective layer of glass flux be deposited on the first sealant layer, that is the sealant layer disposed over the wax layer. Furthermore, where the second design layer is to be formed by silk screening, it is possible to deposit the said design layer directly on the glass layer. However, it is preferred that the second design layer be deposited on the second sealant layer.

As indicated above, the first design layer may comprise a glass flux protective layer which preferably is in the form of a prefused glass flux. Thus, after the above preheated decalcomania is applied to the vitreous surface or article to be decorated, the preheated adhesive bonds the design layer, including the second sealant layer (where employed), the protective layer of glass and the first sealant layer (where employed), that is the sealant layer disposed over the wax layer of the decalcomania backing, to the article; and the backing sheet, the barrier layer, and a portion of the wax layer is released from the remainder of the decalcomania. Upon firing of the assemblage, the protective layer of glass fuses and tightly binds the design layer to the ware and forms a contiguous, durable protective coating on the surface of the design which is impervious to acid and alkali attack, while the organic combustibles of the heat-activatable adhesive layer, the two sealant layers and the remainder of the wax layer are consumed.

In yet another aspect of the present invention, there is provided a method of forming the above-described heat-release type decalcomania, which method comprises applying a barrier coating to a backing sheet, applying a wax coating over the barrier coating in a manner such that the wax layer does not contact the backing sheet, applying a sealant layer, as described herein, over the wax layer, applying a design layer over the sealant layer, and then applying a heat-activatable adhesive composition as described herein to the design layer.

In an alternative embodiment of the above method, where the design layer is applied over the sealant layer, the design layer being in the form of a protective layer of glass flux, another sealant layer is applied over this design layer and thereafter a second design layer is applied over the second sealant layer. The heat-activatable adhesive composition will then be applied to the second design layer. However, as indicated, where the first design layer is a protective layer of glass flux, such protective layer may be deposited directly on the wax layer.

DETAILED DESCRIPTION OF THE INVENTION

Figure 1:
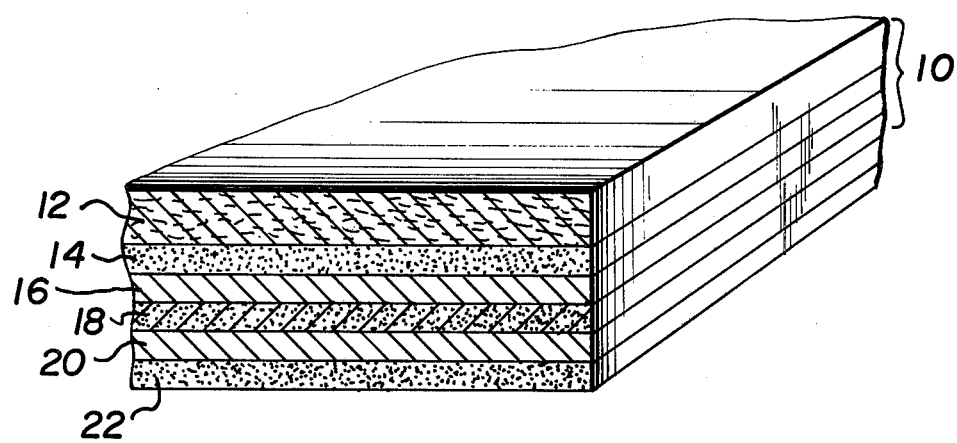
FIG. 1 is a diagrammatic cross-sectional representation of a heat-releasable decalcomania in accordance with the present invention.

FIG. 1 illustrates a heat-release decalcomania in accordance with the invention which includes a decalcomania backing 10 consisting of a paper sheet 12, with barrier layer 14, and covered by wax layer 16. The layers 14 and 16 may be substituted with a silicone layer. A sealant layer 18 of a cellulosic derivative is disposed over wax layer 16, and design layer 20 is disposed over cellulosic derivative or sealant layer 18, which serves as an imprint receiving support for the design layer. Over the design layer 20 is disposed the layer 22 of the heat-activatable adhesive material in accordance with the invention which serves as a temporary binder for securing the design layer 20 to the article to be decorated.

The heat-activatable adhesive layer 22 in accordance with the present invention is comprised of (a) an acrylic resin which serves as the adhesive base component, (b) one or more tackifiers including a polyethylene glycol and/or solid polyoxyethylene derivatives of propylene glycol and/or ethylenediamine, and (c) a major amount of an organic solvent. Preferably, however, component (b) will also include a second tackifier as discussed above. Further, the adhesive layer may also include a cellulosic derivative which moderates the tackiness of the mixture of the acrylic resin and tackifiers and enhances the cohesiveness of such mixture. The adhesive layer 22 also preferably includes an alkyd resin and a polystyrene plasticizer, as described herein. Furthermore, other solid plasticizers may also be added thereto as additional tackifiers. The adhesive may also optionally include other components which will have a softening effect on the cellulosic derivative and/or the acrylic resin or will improve the firing characteristics of the decal.

As indicated, the adhesive base component of the adhesive composition used in the decalcomanias of the invention preferably comprises one or more acrylic resins including acrylic and methacrylic polymers and copolymers such as polybutylacrylate, methyl methacrylate/butyl methacrylate copolymer, polyethyl acrylate, polymethyl acrylate, etc. Particularly suitable are acrylic resins of the Carboset series (trademark of B.F. Goodrich) such as Carboset 514A which is a 70% solution of low molecular weight acrylic copolymer in isopropyl alcohol, and Acryloid resins, such as ethyl methacrylate copolymer B-72 and methyl methacrylate copolymer B-48N, produced by Rohm and Haas Co., Inc.

The polyethylene glycols are employed as one of the tackifiers in the adhesive composition of the invention to provide the desired and required tackifying effect so that these adhesives will be suitable for use herein. These components are crystalline solids which when melted have a relatively long open liquid phase, become tacky and remain tacky for a relatively long period after they cool down to below their melting point and eventually solidify. It has been found that conventional liquid plasticizers by themselves, such as di-ethylhexyl phthalate, dibutyl phthalate and the like do not provide the necessary prolonged tackiness to the adhesive composition so than when such adhesive is heated, it will adhere to the unheated article being decorated. Examples of such polyethylene glycols suitable for use as a tackifier component herein are solids of molecular weights ranging from 700 to 25,000 and preferably from about 3,000 to about 8,000 such as the Carbowax polyethylene glycols including mixtures of one or more such glycols. Such glycols add tack to the adhesive composition while giving a waxy quality thereto so as to inhibit blocking when the decalcomanias including the same are stacked for storage purposes.

The solid polyoxyalkylene derivatives of propylene glycol and/or ethylenediamine suitable for use as a tackifier component herein are solids generally having an average molecular weight of greater than about 5,000, preferably greater than about 8,000. These materials are preferably block polymers. Particular examples of such polyoxyalkylene derivatives of propylene glycol include the non-ionic series of related difunctional block polymers terminating in primary hydroxyl groups sold by BASF Wyandotte under the trademark Pluronic. Again, the solid members of this series of block polymers are useful in the present invention. An Example of the polyoxyalkylene derivatives of ethylenediamine are the non-ionic tetrafunctional series of polyether block polymers sold by BASF Wyandotte under the trademark Tetronic. Once again, the solid members of this series of block polymers are useful in accordance with the present invention. Specific examples of the Pluronic polyols preferred in accordance with the present invention include Pluronic F108, in a flake form having an average molecular weight of about 14,000, Pluronic F98, Pluronic F127, and Pluronic 25R8. Examples of the Tetronic compositions which are most highly preferred in accordance with the present invention include Tetronic 1508, which is in the solid form having an average molecular wieght of about 27,000, Tetronic 1307, etc.

The aromatic acid esters of monomeric and polymeric alkyl polyols can also be employed as one of the second tackifler components when a combination of such tackifiers is used in the adhesive composition of the invention, again to provide the desired and required tackifying effect so that these adhesives will be suitable for use herein. Examples of such aromatic ester tackifiers suitable for use herein include, but are not limited to, benzoic acid esters of alkylene or polyalkylene glycols such as neopentyl glycol dibenzoate (Benzoflex S-312), triethylene glycol dibenzoate (Benzoflex S-358), glyceryl tribenzoate (Benzoflex S-404), trimethylolethane tribenzoate (Benzoflex S-432), and pentaerythritol tetrabenzoate (Benzoflex S-552), (Benzoflex being a registered trademark of Velsicol Chemical Corp., Chicago, Illinois), as well as other polyol benzoates having melting points ranging from 47° to 99° C., and which have an unusual tendency to supercool and to recrystallize slowly.

The solid plasticizers which may be used as a tackifier in these adhesive compositions will thus include the aryl phthalates, such as diphenyl phthalate and dicyclohexyl phthalate.

The cellulosic derivatives can be used to moderate the acrylic resin, and to make it less tacky or less sticky. In addition, it will improve the firing or "burn-off" quality of the adhesive composition when it is fired. Examples of suitable cellulosic derivatives include cellulose acetate butyrate, nitrocellulose, cellulose acetate, cellulose acetate propionate, ethyl cellulose, methyl cellulose and the like. Preferred are cellulose acetate butyrates having a melting point ranging from about 265° to about 465° F.

The alkyd resins can be employed as modifiers for the adhesive composition, causing it to be easily softened upon application of heat thereto while also improving the "burn-off" qualities when the adhesive composition is fired, as in the case of the cellulosic derivatives discussed above. Furthermore, it inhibits formation of pinholes in the decalcomania during firing and lift-off of the decal from the ware. The alkyd resin suitable for use herein preferably comprise long oil alkyds such as a long oil soya type alkyd, for example BURNOK 4040-LOMS-60 or BURNOK 4040-OMS-60, products of Washburn-Lanson Company of Chicago, Illinois.

In addition, the adhesive composition may also preferably include a polystyrene plasticizer in admixture with the tackifier. Examples of such polystyrene plasticizers suitable for use herein are polymerized alpha-methyl styrenes, such as DOW resin 276-V2 and 276-V9.

Finally, these components of the adhesive compositions are employed in conjunction with one or more organic solvents which will substantially dissolve all solids to provide a flowable, but viscous, lacquer-like consistency to the composition. Thus, these adhesive components are not employed in aqueous solutions or dispersions, as are the prior delayed tack adhesives discussed above. Such solvents may thus include any of the known organic solvents for these components. Examples of such solvents include aromatic solvents such as any of the Solvesso (trademark of Exxon Corp.) line of solvents such as Solvesso Toluol, Solvesso Xylol, Solvesso 150 and 100, alcohols such as ethyl alcohol, butyl alcohol, diacetone alcohol, chlorinated hydrocarbons such as trichlorobenzene or O-dichlorobenzene, ketones such as acetone or cyclohexanone, esters such as ethyl lactate, butyl lactate and isobutylacetate, methyl butyl and ethyl Cellosolve (trademark of Union Carbide Corporation), monomethyl ether acetate of ethylene glycol, monomethyl ether of ethylene glycol and mixtures thereof, and the like.

The adhesive composition of the invention will generally contain the acrylic resin in an amount within the range of from about 10 to about 40% by weight, preferably from about 10 to about 35% by weight, and more preferably from about 12 to about 26% by weight, and most preferably from about 16 to about 26% by weight. The polyethylene glycols and/or polyoxyalkylene derivative tackifier component will generally be used in an amount within the range of from about 1 to about 25% by weight, and preferably from about 4 to about 25% by weight, and most preferably from about 6 to about 25% by weight. The aromatic ester tackifier component, when used, will generally be used in an amount within the range of from about 2 to about 25 % by weight, preferably from about 3 to about 20% by weight, more preferably from about 3 to about 15% by weight, and most preferably from about 5 to about 7% by weight. The remainder of the adhesive will thus comprise the organic solvent, with or without the optional components as set out above.

In any event, however, in the most preferred adhesive compositions of the present invention, the ratio of the total amount of acrylic resin to the total amount of the combination of tackifiers, that is including the polyethylene glycol and/or the polyoxyalkylene derivative, as well as the aromatic ester, will be in the range of from about 3 to 2, preferably about 4 to 3, most preferably about 2 to 3, and in the most preferred embodiment about 1:1. This may be compared to the delayed-tack adhesives discussed above which generally include a ratio of 1 part or less of resin to 2 parts of plasticizer or tackifier. The higher ratio of resin contained in the present formulations again provides for a more cohesive coating, and provides a less prolonged tack time in the application to decalcomanias. While the exact ratio will thus depend somewhat upon the specific materials utilized, a higher ratio of resin is used as compared to the delayed tack patents of the prior art adhesives which require much longer tack periods of greater than about several hours.

With respect to the optional components which may be present in the adhesive composition of the invention, the solid plasticizers can be present in an amount within the range of up to about 20%, preferably from about 3 to 15% by weight, and most preferably from about 5 to 12% by weight. The cellulosic derivative may be present in an amount within the range of up to about 15% by weight, preferably up to about 8% by weight, and most preferably from about 3 to 5% by weight; the alkyd resin may be present in an amount within the range of up to about 10% by weight, preferably up to 7% be weight, most preferably from about 1 to 5% by weight; the polystyrene plasticizers may be present in an amount within the range of up to about 25% by weight, preferably up to about 10% by weight, most preferably from about 2 to 6% by weight.

The following are preferred formulations of adhesive compositions in accordance with the invention:

|  | A | B | C | D | E | F | G* | H | I |
|---|---|---|---|---|---|---|---|---|---|
| Acrylic Resin |  |  |  |  |  |  |  |  |  |
| Carboset 514A | — | 16 | 11.5 | 18 | — | 19.5 | 12 | — | — |
| Acryloid B-72 | — | 11 | 4.5 | 6.5 | — | 7 | 12 | — | — |
| Acryloid B-48N | 19 | — | — | — | 16.6 | — | — | 22.5 | 22.5 |
| Polyol benzoate |  |  |  |  |  |  |  |  |  |
| Benzoflex S-404 | 5.4 | — | 4.5 | — | 4.7 | — | — | — | — |
| Benzoflex S-552 | — | 5.5 | — | 6.5 | — | 7 | — | — | — |
| Polyethylene glycol |  |  |  |  |  |  |  |  |  |
| Carbowax (4,000 or 6,000) | — | 8 | — | 8 | — | 9 | 6 | — | 19 |
| Polyoxyalkylene Derivatives |  |  |  |  |  |  |  |  |  |
| Pluronic F-108 | 16 | — | 20.5 | — | 14.2 | — | — | 19 | — |
| Cellulosic Derivative |  |  |  |  |  |  |  |  |  |
| Cellulose Acetate Buryrate (½ sec.) | — | — | 4.5 | 1.5 | 4.1 | — | — | — | — |
| Polystyrene Plasticizer |  |  |  |  |  |  |  |  |  |
| Polystyrene 279V9 | — | 4 | — | 3 | — | 5 | 6 | — | — |
| Alkyd Resin |  |  |  |  |  |  |  |  |  |
| BURNOK 4040-LOMS-60 | — | 4 | 2 | 4 | — | 5 | — | — | — |
| Solvent |  |  |  |  |  |  |  |  |  |
| (remainder up to 100% |  |  |  |  |  |  |  |  |  |

|  | -continued | | | | | | | |
|---|---|---|---|---|---|---|---|---|
|  | A | B | C | D | E | F | G* | H | I |
| in each case) | | | | | | | | |

A preferred solvent mixture is comprised of the following:

| | % by weight of solvent mixture |
|---|---|
| Ethylene Glycol momomethyl ether acetate | 33 |
| Ethylene Glycol momomethyl ether | 33 |
| Diacetone alcohol | 14 |
| n-Butyl Alcohol | 20 |
| | 100% |

*G includes 12% Dicyclohexyl Phthalate as a solid plasticizer

The adhesive composition may be applied over the design layer 20 by silk screening techniques, by the use of a doctor blade, and by other conventional techniques as will be apparent to one silled in the art.

In attempting to provide a heat releasable vitreous decalcomania by utilizing a wax coated paper as the temporary backing, difficulty may be encountered with proper release of the design layer from the backing upon application of heat. It has been found that such difficulty is accounted for at least in part by the fact that the molten wax under certain conditions tends to be absorbed into the porous paper sheet before the sheet and the vitreous design can be saparated. Consequently, the ceramic colors have an opportunity to make direct contact with the paper sheet and tend to stick or adhere tenaciously to the same if there is no intervening film of wax or similar release material.

The temporary backing sheet 12 may comprise a suitable sheet material which is relatively non-porous and substantially impervious to the release layer of wax or equivalent material when the latter is in softened or molten condition. For example, the temporary backing may comprise a plastic film such as cellulose acetate or a thin metal foil or a fabric. However, in most cases it will be found most economical to employ a paper backing sheet 12 with a barrier coating 14 of a character which will resist penetration by molten wax or the like.

Generally, the barrier layer 14 may be in the nature of a surface sizing or seal coating such as starch, casein, glue, alkali metal silicate, etc., either with or without a clay type filler. A highly satisfactory barrier layer comprises water glass or other alkali metal silicate having dispersed therein talc, clay or like filler. As will be well understood, presence of the barrier coating 14 on the paper 12 prevents excessive penetration and absorption of the wax coating 16 when the latter becomes soft or molten under heat release conditions. Consequently, there is always a film of wax material between the design layer and the temporary backing so as to facilitate rapid and trouble-free release of the design layer and thereby avoid bonding or adherence of the ceramic color components to the paper. Obviously, the material selected form the barrier layer 14 must be stable and relatively unaffected by the temperatures normally encountered during heat release application of the decalcomania. It has also been found that the presence of the barrier coating 14 which seals the pores of the paper, apparently results in a more uniform and smoother wax coating 16.

The wax coating 16 may comprise a relatively high melting point wax of vegetable or mineral origin, e.g. vegetable wax having a melting point of from about 130° to about 160° F. or a mineral wax having a melting point of from about 180° to about 220° F. However, instead of the vegetable or mineral waxes, normally solid polyethylene glycols having a relatively high molecular weight of at least 1,000 may be employed. Such materials are wax-like solids and are sold for example by Union Carbide Corporation under the trademark "Carbowax." Examples of such materials are Carbowax compounds 4000, 6000 and 20M. These wax-like materials can be applied in generally the same manner as ordinary wax coatings and are particularly advantageous for purposes of the present invention because of their relatively slight solubility in and their resistance to penetration by petroleum hydrocarbons, and because of their excellent firing qualities, particularly their ability to burn without excessive carbon deposition. At the same time, such normally solid polyethylene glycols have softening points in the range of from about 120° to about 145° F, so that they are capable of providing the desired heat release properties under a variety of practical operating conditions. Generally speaking, it is preferred to employ a polyethylene glycol polymer having a softening point in the lower portion of the aforementioned range so as to obtain the desired softening and heat release effect as rapidly as possible during use of the decalcomania. This is particularly important in the case of automatic or machine application of the decalcomanias. As described hereinafter in more detail, a particularly important advantage of the use of polyethylene glycols or the like for the wax coating 16 is found in the relative insolubility of such compounds in the solvents employed in the formulation of the sealant or design support layer and the ceramic color materials used for the virtreous design layer 20 of the decalcomanias. As will readily be appreciated, under such conditions there is no tendency for migration or deterioration of the layer 16 when the vitreous or ceramic color formulation is applied as on to sealant layer 18 by lithographic or silk-screen techniques during manufacture of the decalcomania. Consequently, when the vitreous design is dry, it will be seen that it is disposed in readily releasable relation on sealant layer again the wax coating 16.

It will also be appreciated that the backing sheet 12, the barrier layer 14, and wax layer 16 may be substituted for by a paper backing sheet which includes a silicone layer thereon.

The design layer 20 may be applied to the backing as one or more layers of an ink comprising an oxide colorant and a printing medium or vehicle with or without a glass flux or binder. The ink should contain from about 30 to 70% or more by weight oxide colorant. The printing medium or vehicle may be formed, for example, from one or more of such materials as drying oils, varnishes or resins. Some examples of suitable resins are alkyds, phenolics urea-formaldehydes, melaminformaldehydes, polyesters, melamine alkyds, vinyls, and acrylics. Various additives may be incorporated into the vehicles, for example, dryers, promoters and/or accelerators.

The coloring agents of the design layer comprise ceramic pigments, having an average particle size within the range of from about 0.5 to about 2 microns which are incorporated into the binder or vehicle. Preferably, the pigments are metallic oxides of fine particle size, such as of an average particle size of less than about 1 micron. The pigments which may be used and the manner of their use are known to those skilled in the art. The oxides of the following elements are mentioned merely by way of example of some suitable ceramic pigments and the colors obtainable therefrom.

| Oxide of | Color |
|---|---|
| Fe, Cr, Zn | Brown |
| Co, Al | Blue |
| Cr | Green |
| Pb, Sb, Cd | Yellow |
| Cd, Se, S | Red |

As known to those skilled in the art, the composition of the vehicle or binder of the design layer is varied depending upon the oxide or oxides used as coloring agent and whether or not glass is present in the design layer. While the ink formulation must be varied depending upon the oxides employed, as is known to those skilled in the art, some typical ink formulations wherein the parts are expressed as parts by weight are as follows:

| INGREDIENT | 1 | 2 | 3 |
|---|---|---|---|
| Gel #100 (linseed-alkyd resin varnish gelled by aluminum octoate supplied by Zobel Co.) | 10 | 12 | 15 |
| Linseed #4 (linseed oil of 62.1 stokes viscosity) | 10 | — | — |
| Linseed #1 (linseed oil of 14.4 stokes viscosity) | 15 | — | — |
| Lead Drier | 2 | 4 | 4 |
| Manganese 2 | 4 | 4 | |
| Oxide (pigment) | 60 | 120 | 120 |
| Aroplaz 2506 (alkyd resin supplied by Archer-Daniels) | — | 30 | 25 |
| Aroplaz 1274 (alkyd resin supplied by Archer-Daneils) | — | 20 | 25 |
| Puffo #2 (Thixotropic control agent supplied by Mooney) | — | 3 | 3 |
| Petroleum Jelly | — | — | 5 |

The design layer may include a quantity of powdered glass therein to act as a bonding agent. Other bonding agents may be employed in conjunction with the design forming components as will be apparent to one skilled in the art.

The design layer of one embodiment of the decalcomania of the invention can be formed by mixing particles of glass with each of the ceramic colors or pigments to be employed, prior to laydown of the colors to form the design layer. The glass will be mixed with each of the colors, for example, by blending, in an amount to provide a weight ratio of color:glass within the range of from about 1:4 to about 4:1 and preferably, from about 1:2 to about 2:1. The glass and color may be sintered together for added stability. The glass and color particles to be mixed will have an average particle size ranging from 0.5 to 2 microns.

The design layer may be deposited on the sealent layer, where employed, by any conventional printing technique such as offset lighography, silk screening, and the like and even by moist printing techniques as set forth in U.S. Application Ser. No. 193,153 filed Oct. 27, 1971 by Blanco, which portion thereof is incorporated herein by reference thereto.

The sealent layer 18 which provides a base or support for a design layer generally comprises a cellulosic derivative or resinous film-forming agent which is capable of being completely consumed on firing of the design layer to the ware to be decorated at the usual firing temperatures. Furthermore, such cellulosic derivative or resinous film forming agent must be a liquid or capable of being dissolved in a suitable solvent or vehicle which has no substantial effect on the wax coating, so that it can be applied as a fluid formulation on the wax coating. Upon drying of the fluid formulation, the resulting solid layer must adhere or bond to the wax layer. Where the design layer is to be imprinted on the sealent layer by, for example, lithographic techniques, the sealent layer must remain tightly bonded to the wax layer so that the design layer can be printed thereon without pulling the sealent layer off.

The cellulosic derivative film-forming agent suitable for use herein is usually employed in conjunction with one or more solvents, bonding agents and/or plasticizers and should be capable of adhering to the wax layer even while imprinted thereon by lithographic techniques. Examples of suitable cellulosic derivatives include cellulose acetate butyrate, nitrocellulose, cellulose acetate, cellulose acetate propionate, cellulose acetate butyrate admixed with from about 10 to about 85% by weight acrylic resin, such as Carboset resin (B.F. Goodrich Co.), ethyl cellulose, methyl cellulose and the like.

The sealant layer preferably comprises cellulose acetate butyrate having a melting point ranging from about 265° to about 465° F.

The above cellulosic derivatives are usually employed in conjunction with one or more solvents so that the cellulosic derivative may be deposited as a liquid on the wax layer. Such solvents may include any of the known solvents for these cellulosic materials. Examples of such solvents include aromatic solvents such as any of the Solvesso (trademark of Exxon Corp.) line of solvents such as Solvesso Toluol, Solvesso Xylol, Solvesso 150 and 100, alcohols such as ethyl alcohol, butyl alcohol, diacetone alcohol, chlorinated hydrocarbons such as trichlorobenzene or o-dichlorobenzene, ketones such as acetone or cyclohexanone, esters such as ethyl lactate, butyl lactate and isobutylacetate, methyl Cellosolve, butyl Cellosolve, ethyl Cellosolve and the like.

Where necessary a bonding agent may be employed in conjunction with the cellulosic derivative to ensure that the cellulosic derivative will adhere to the wax layer. Such bonding agent may comprise one or more of the above solvents such as the Solvesso solvents, for example Solvesso 100, butyl lactate, ethyl lactate and the like.

The cellulosic derivative may also be employed in conjunction with appropriate plasticizers such as di-2-ethylhexyl phthalate, chlorinated diphenyl, dibutyl phthalate, castor oil, and the like.

The sealant layer may be formed of cellulosic derivative in an amount ranging from about 5 to about 30% preferably from about 10 to about 25%, with from about 50 to about 85% and preferably from about 60 to about 80% solvent and/or bonding agent and/or from about 5 to about 25%, preferably from about 8 to about 15% plasticizer and/or bonding agent, all such percentages being based on the total weight of the sealent layer.

The following is a preferred formulation of a sealant layer employed in accordance with the present invention.

|  | % by weight |
| --- | --- |
| Cellulose acetate butyrate (M.P. about 400° F) | 15 |
| Solvesso 100 | 35 |
| Diacetone alcohol | 25 |
| Dioctyl phthalte | 10 |
| Methyl Cellusolve | 15 |
|  | 100% |

It will be understood that where the sealant layer is to be imprinted by silk screening, the sealant layer need not be as strongly bonded to the wax layer as when it is to be imprinted by lithographic techniques. Thus, where silk screening is employed, the sealant layer may not require a bonding agent, and/or plasticizer.

It is usually desirable to employ a color:printing medium ratio ranging from 2:1 to about 5 or more:1 and preferably from about 3:1 to about 4:1 in order to obtain the desired depth of coloring agent forming the design layer.

A preferred declacomania backing as shown in FIG. 1 includes a paper sheet, a starch barrier layer, and a wax layer comprising Carbowax. Printed over the wax-coated paper backing sheet, the decal consists of a sealant layer as shown in the preferred formulation set out above, a design layer, and an adhesive layer of any of Formulations A-I set out hereinabove.

Figure 2:
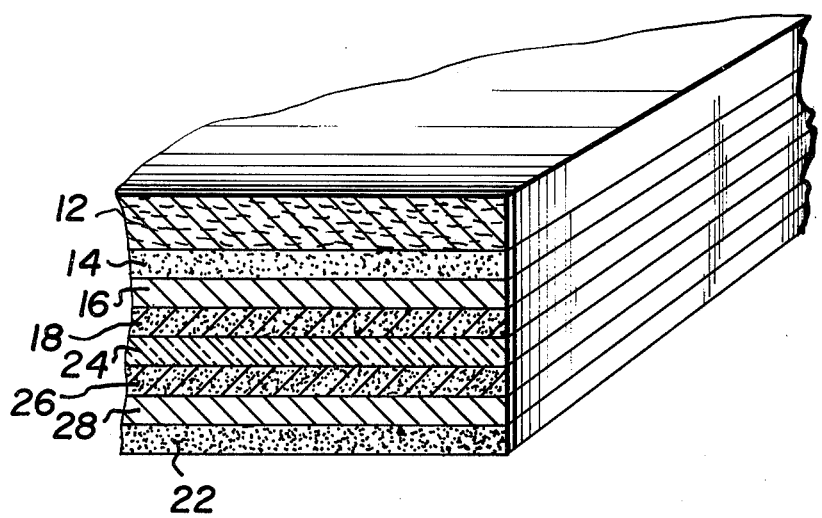
FIG. 2 is a diagrammatic cross-sectional representation of another embodiment of the heat-releasable type decalcomania in accordance with the invention.

FIG. 2 shows another embodiment of the heat-release decalcomania of the invention which includes a protective layer of glass flux over the design layer, in situ, in the decalcomania. Such heat-release decalcomania includes a decalcomania backing as shown in FIG. 1 including a backing sheet, such as a paper sheet 12, a barrier layer 14, and wax layer 16. Over wax layer 16 is a sealant layer 18. Disposed on sealant layer 18 is a protective layer 24 which preferably comprises a prefused glass flux layer. A second sealant layer 26 is disposed on the glass flux layer 24 and a design layer 28 is imprinted on the second sealant layer 26. Disposed over the design layer 28 is a heat-activatable adhesive layer 22 as employed in the decalcomania shown in FIG. 1.

The glass flux protective layer 24 is preferably a powdered prefused glass layer or coating which is colorless so that it does not interfere with or mask the colors of the design layer.

An amount of the glass flux should be deposited on the sealant layer 18 so that the protective glass coating thereafter formed will have a thickness within the range of from about 6 to about 28 microns and preferably from about 9 to about 20 microns. Thus, the ratio of thickness of the glass protective layer to the design layer should be within the range of from about 0.25:1 to about 5:1 and preferably from about 0.5:1 to about 3:1.

The coating or layer of powdered glass may be a low melting point glass or a high melting point glass having an average particle size within the range of from about 0.5 to 12 microns depending upon the manner in which the glass layer is laid down. The essential requirement is that the glass should fuse at the firing temperature employed to bond the design to the ware. A low melting point glass may be composed essentially of powdered prefused lead boro-silicate glass which may also contain increments of one or more of the oxides of lithium, sodium, potassium, magnesium, calcium, aluminum, cadmium, zirconium, tin or titanium.

A prefused flux may, for example, be formed according to the following formulation:

| Ingredient | % by weight |
| --- | --- |
| lead oxide | 50 |
| boric acid | 30 |
| silica | 19 |
| alumina | 1 |
| zirconia | trace |
| titania | trace |

The protective glass layer may be applied over the sealant layer 18 by various methods, such as silk screening, offset printing, or by printing a clear film over the sealant layer 18 then dusting a prefused frit over the film. For example, by one method, a layer of varnish may be applied by a lithographic process to the areas it is desired to protect and the powdered glass then dusted on. This procedure could be repeated until desired thickness has been built up. If desired, the dusting operation may be eliminated by incorporating powdered glass into a film such as printing varnish, oil or resin.

Another method which may be used is to suspend the powdered glass in one of the various commonly known screening media or pastes. The contents of this paste may vary between 60 to 80 percent by weight of powdered glass and 40 to 20 percent by weight of the liquid vehicle. This paste may then be applied over the desired area by means of a silk or metal screening fabric acting as a stencil. By this method the area of application is easily controlled. When using this method of application, sealant layer 18 may not be required.

After the protective glass flux layer is applied over the sealant layer 18, the second sealant layer 26 is applied over the protective layer 24. The second sealant layer 26 and the first sealant layer 18 may be of the same or different compositions. Inasmuch as it is more difficult to bond the sealant layer 18 to the wax layer 16 than it is to bond the sealant layer 26 to the protective glass layer 24, the sealant layer 26 may or may not include a bonding agent or other means for bonding the cellulosic derivative film-forming agent to the protective glass layer 24 where the glass layer is deposited by silk screen.

The second sealant layer 26 thus will generally comprise a cellulosic derivative film forming agent such as any of the cellulosic derivatives set out hereinbefore and preferably is cellulose acetate butyrate. In addition, if desired, such cellulosic derivative may include solvents, bonding agents, and/or plasticizers as described above in conjunction with the first sealant layer 18. A preferred second sealant layer 26 comprises the sealant layer composition set out hereinbefore with respect to FIG. 1.

The design layer 28 will generally comprise coloring agents, and a printing medium or vehicle and optionally glass particles as described hereinbefore with respect to the design layer 20 in FIG. 1. Design layer 28 can be imprinted on the second sealant layer 26 employing any conventional printing techniques such as described above in conjunction with FIG. 2.

It has been found that the design layer 28 cannot be imprinted directly on the protective layer 24 by lithographic techniques inasmuch as the color pigments of the design layer have been found to stain the protective layer and thus render the resulting decalcomania unacceptable. In accordance with the present invention, it has been found that in order to employ a protective glass layer over the design layer (deposited by lithographic techniques) in a heat-release decalcomania, it is necessary to separate the protective layer and the design layer from each other by employing a sealant layer 26 as described above.

In using the heat-release decalcomania shown in FIG. 2, adhesive layer 22 of the decalcomania is heated to its melting point and is applied to a ware to be decorated which causes heat-activatable adhesive layer 22 to bond the design layer 28 as well as the second sealant layer 26, the protective glass layer 24 and the first sealant layer 28, and perhaps a portion of the wax layer 16, to the ware or article. At this time, the backing sheet 10 including the barrier layer 14, and a portion of the wax layer 16 is released from the remainder of the decalcomania. Upon firing of the assemblage, the protective glass layer fuses and tightly binds the design layer to the ware and forms a contiguous, durable protective coating over the design on the surface of the ware. The organic combustibles of the heat-activatable adhesive layer, the two sealant layers and the remainder of the wax layer are burned off during the firing.

The article is usually fired at a relatively low temperature and the powdered glass fuses so as to form an integral part of the article and provides a glass layer which protects the pigment of the design layer from chemical or mechanical action. A relatively low temperature can be used where the layer of glass powder is made up of prefused glass which will melt at much lower temperature than is required to fuse the raw materials from which the glaze on the ceramic ware itself is formed, in the case of an overglaze decalcomania. The usual firing temperature required for this operation is between 1000° F. and 1600° F. It should be particularly noted at this point that this low temperature unlike the high temperatures used in applying the glaze to the entire article, does not operate to destroy or impair the color values of the pigments used. When using this decalcomania, as with all overglaze decals, the glaze is applied and fired on the ware before the decalcomania is transferred to the article, and thus the decalcomania is not subject to high temperatures. But in this case to protect the decalcomania and provide a permanent design preferably a low melting point glass is used over the pigments. The pigment is protected in much the same manner as the underglazed decals and yet the color values are not impaired by the application of very high temperatures such as are required in firing the glaze. Pigments of the type which are affected by contact with molten glass are affected in this case at the surface only and not sufficiently to impair color value of decalcomania.

Each of the embodiments of the decalcomania of the invention may be provided with a release layer disposed over the outer surface of the backing sheet 12 (that is the surface disposed away from the barrier layer 14). Such a release layer may be employed in lieu of a slip sheet and will facilitate stacking of a group of the decalcomanias and inhibit blocking or sticking of the decalcomanias to each other. The release layer may comprise any conventional types of release layers employed for this purpose.

The decalcomanias of the invention may be employed as decorations for ceramic ware, glassware, pottery, aluminum, porcelain enamel, or any other ware or surface which is normally decorated at 1600° F., or below, as well as for bisque or green ware, at higher temperatures.

It will be appreciated that the present description has been by way of example only and is not intended as a limitation to the scope of the invention.

What is claimed is:

1. A heat release ceramic decalcomania comprising a backing sheet, a wax layer disposed on said backing sheet, a design layer disposed on said wax layer, and a heat-activatable adhesive layer disposed on said design layer, said adhesive layer comprising from about 10 to about 40% of an acrylic resin as an adhesive base component, said acrylic resin comprising the polymers and copolymers of the acrylates and methacrylates, from about 1 to about 25% of a tackifier for said acrylic resin, said tackifier being selected from the group consisting of polyethylene glycols and solid polyoxyalkylene derivatives of propylene glycol and ethylene diamine, said tackifier being capable of providing an adhesive which softens when subjected to heat and remains tacky at a temperature substantially below its melting point, and an organic solvent therefor, said adhesive compositon being capable of burning upon the firing of said decalcomania substantially without the deposition of a residue.

2. The decalcomania in accordance with claim 1 wherein said adhesive layer comprises a combination of tackifiers, including from about 2 to about 25% of a second tackifier comprising an aromatic acid ester of a monomeric or polymeric alkyl polyol.

3. The decalcomania in accordance with claim 1 wherein said adhesive composition includes an alkyd resin.

4. The decalcomania in accordance with claim 1 wherein said adhesive layer includes up to about 15% by weight of a cellulosic derivative selected from the group consisting of cellulose acetate butyrate, nitrocellulose, cellulose acetate, cellulose acetate propionate, ethyl cellulose, methyl cellulose, and mixtures thereof, said cellulosic derivative selected to moderate the tackiness of the mixture of acrylic resin and tackifiers and to enhance the cohesiveness of said mixture.

5. The decalcomania in accordance with claim 2 wherein the ratio of said acrylic resin to said combination of tackifiers is in the range of from about 3:2 to about 2:3.

6. The decalcomania in accordance with claim 5 wherein the ratio of said acrylic resin to said combination of tackifiers is about 1:1.

7. The decalcomania in accordance with claim 1 wherein said adhesive layer includes a polystyrene plasticizer.

8. The decalcomania in accordance with claim 4 wherein said cellulosic derivative comprises a cellulose acetate butyrate.

9. The decalcomania in accordance with claim 2 wherein said aromatic acid ester of a monomeric or polymeric alkyl polyol comprises a benzoic acid ester of an alkylene or polyalkylene glycol.

10. The decalcomania in accordance with claim 9 wherein said benzoic acid ester of an alkylene or polyalkylene glycol is selected from the group consisting of neopentyl glycol dibenzoate, triethylene glycol dibenzoate, glyceryl tribenzoate, pentaerythritol tetrabenzoate, trimethylolethane tribenzoate, and mixtures thereof.

11. The decalcomania in accordance with claim 1 wherein said polyoxyalkylene derivatives of propylene glycol and ethylene diamine are selected from the group consisting of solid difunctional block polymers terminating in primary hydroxyl groups having molecular weight greater than about 5000 and solid nonionic tetrafunctional polyether block polymers having molecular weight of at least about 5000.

12. The decalcomania in accordance with claim 7 wherein said polystyrene plasticizer comprises polymerized alpha-methylstyrene.

13. The decalcomania as defined in claim 1 including a release layer.

14. The decalcomania in accordance with claim 1 including a sealant layer comprising a cellulosic derivative or resinous film-forming agent disposed between said design layer and said wax layer, and acting as a support for said design layer.

15. A heat-release ceramic decalcomania as defined in claim 14 including a first design layer disposed on said sealant layer, a second sealant layer comprising a cellulosic derivative or resinous film-forming agent disposed on said first design layer, a second design layer disposed on said second sealant layer, and said adhesive layer disposed on said second design layer.

16. The decalcomania in accordance with claim 15 wherein said first design layer comprises a glass flux protective layer.

17. The decalcomania in accordance with claim 16 wherein said glass flux protective layer comprises a layer of prefused glass flux.

18. The heat-release ceramic decalcomania in accordance with claim 14 wherein said sealant layer disposed on said wax layer of said decalcomania backing sheet comprises cellulose acetate butyrate.

19. The decalcomania in accordance with claim 15 wherein said second sealant layer comprises cellulose acetate butyrate.

20. A decalcomania comprising a wax coated backing sheet, a protective layer of glass flux disposed over said wax coated backing sheet, a sealant layer disposed over said protective layer, a design layer disposed over said sealant layer and a heat-activatable adhesive in accordance with claim 1 disposed on said design layer.

21. A heat-release ceramic decalcomania comprising a wax coated backing sheet, a protective layer of glass flux disposed over said wax coated backing sheet, a design layer disposed over said protective layer, and an adhesive layer in accordance with claim 1 disposed on said design layer.

22. method for forming a decalcomania comprising a wax coated backing sheet, a design layer disposed on said wax coated backing sheet, and a heat-activatable adhesive layer disposed on said design layer, which comprises applying said design layer on said wax coated backing sheet, and applying said heat-activatable adhesive layer on said design layer, said adhesive layer comprising from about 10 to about 40% of an acrylic resin as an adhesive base component, said acrylic resin comprising the polymers and copolymers of the acrylates and methacrylates, from about 1 to about 25% of a tackifier for said acrylic resin, said tackifier being selected from the group consisting of a polyethylene glycol and solid polyoxyalkylene derivatives of propylene glycol and ethylene diamine, and an organic solvent therefor.

23. The method in accordance with claim 22 wherein said adhesive layer comprises a combination of tackifiers including from about 2 to about 25% of a second tackifier comprising an aromatic acid ester of a monomeric or polymeric alkyl polyol.

24. The method in accordance with claim 23, wherein said adhesive layer includes a cellulosic derivative selected from the group consisting of cellulose acetate butyrate, nitrocellulose, cellulose acetate, cellulose acetate propionate, ethyl cellulose, methyl cellulose, and mixtures thereof, said cellulosic derivative selected to moderate the tackiness and enhance the cohesiveness of said mixture of acrylic resin and tackifier.

25. The method in accordance with claim 22 wherein said adhesive includes a polystyrene plasticizer.

26. A method for forming a heat-releasable ceramic decalcomania which comprises applying a first sealant layer over a wax-coated backing sheet, applying a first design layer on said sealant layer, applying a second sealant layer over said first design layer, applying a second design layer over said second sealant layer, and then applying a heat-activatable adhesive layer over said second design layer, said adhesive layer comprising from about 10 to about 40% of an acrylic resin as an adhesive base component, said acrylic resin comprising the polymers and copolymers of the acrylates and methacrylates, from about 1 to about 25% of a tackifier for said acrylic resin being selected from the group consisting of a polyethylene glycol, and solid polyoxyalkylene derivatives of propylene glycol and ethylene diamine and an organic solvent therefor.

27. The method in accordance with claim 26 wherein said first design layer is a protective layer of glass flux.

28. The method in accordance with claim 26 wherein said first and second sealant layers comprise cellulosic derivative film-forming agents.

29. A method for decorating a ceramic ware with the heat-release ceramic decalcomania as defined in claim 1 which comprises heating the adhesive layer thereof to activate the same, applying said decalcomania to said ware so that said heat-activatable adhesive contacts said ware and temporarily adheres said decalcomania to said ware and said wax layer simultaneously melts releasing said backing sheet from the remainder of said decalcomania, and firing said ware to fuse the vitrifiable components of said design layer to said ware.

30. A method for decorating a ceramic ware with a heat-release ceramic decalcomania as defined in claim 15 which comprises heating the adhesive layer thereof to activate the same, applying said decalcomania to said ware so that said heat-activatable adhesive contacts said ware, and temporarily adheres said decalcomania to said ware and said wax layer simultaneously melts releasing said backing sheet from the remainder of said decalcomania, and firing said ware to fuse said glass flux protective layer and the vitrifiable components of said design layer to said ware, and glass flux layer forming a contiguous, durable protective layer on the ware overlying said design layer.

* * * * *

UNITED STATES PATENT AND TRADEMARK OFFICE
CERTIFICATE OF CORRECTION

PATENT NO. : 4,068,033
DATED : January 10, 1978
INVENTOR(S) : Hazel Meade

It is certified that error appears in the above-identified patent and that said Letters Patent are hereby corrected as shown below:

Column 3, line 43, the word "dispoed" should read -- disposed --.
Column 8, line 37, before "and" insert -- more preferably from about 2 to about 8% by weight, --.
Column 9, line 25, the word "saparated" should read -- separated --.

Column 11, in the table reading
INGREDIENT       1    2    3  , the line Manganese 2 should read:

Manganese Drier    2    4    4

Column 15, line 14, the numeral 28 should be -- 18 --.
Column 17, line 49, before the word "method" insert -- A --.

Signed and Sealed this

Sixteenth Day of May 1978

[SEAL]

Attest:

RUTH C. MASON
Attesting Officer

LUTRELLE F. PARKER
Acting Commissioner of Patents and Trademarks